(12) United States Patent
Urakawa et al.

(10) Patent No.: US 9,890,978 B2
(45) Date of Patent: Feb. 13, 2018

(54) RENEWAL METHOD OF AIR-CONDITIONING UNIT FOR VEHICLE AND AIR-CONDITIONING UNIT FOR VEHICLE

(75) Inventors: Masatoshi Urakawa, Chiyoda-ku (JP); Shiro Takatani, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 791 days.

(21) Appl. No.: 13/813,176

(22) PCT Filed: Sep. 10, 2010

(86) PCT No.: PCT/JP2010/005557
§ 371 (c)(1),
(2), (4) Date: Jan. 30, 2013

(87) PCT Pub. No.: WO2012/032587
PCT Pub. Date: Mar. 15, 2012

(65) Prior Publication Data
US 2013/0133344 A1 May 30, 2013

(51) Int. Cl.
*F25B 45/00* (2006.01)
*B60H 1/00* (2006.01)
(Continued)

(52) U.S. Cl.
CPC ......... *F25B 45/00* (2013.01); *B60H 1/00371* (2013.01); *B60H 1/00585* (2013.01);
(Continued)

(58) Field of Classification Search
CPC .............. B61D 17/12; B61D 27/0072; F25B 2345/002; F25B 2345/001; F25B 45/00;
(Continued)

(56) References Cited

U.S. PATENT DOCUMENTS 4,727,728 A * 3/1988 Brown ............... B60H 1/00371
312/257.1
4,732,011 A * 3/1988 Haiya ............... B60H 1/00371
62/244
(Continued)

FOREIGN PATENT DOCUMENTS

JP          4-191168 A      7/1992
JP          5-16654 A       1/1993
(Continued)

OTHER PUBLICATIONS

"Machine Translation of JP2009222363 A, Yamaguchi, Oct. 2009".*
(Continued)

*Primary Examiner* — Frantz Jules
*Assistant Examiner* — Martha Tadesse
(74) *Attorney, Agent, or Firm* — Buchanan Ingersoll & Rooney PC

(57) ABSTRACT

A renewal method of an air-conditioning unit for vehicle in which an air-conditioning unit using a former refrigerant disposed in a frame mounted on a vehicle is renewed to an air-conditioning unit using an alternative refrigerant, the renewal method including a removal step of: a removing the existing air-conditioning unit from the frame; an assembly step of disposing the new air-conditioning unit, which is configured so as to be capable of fitting in the frame, in the frame; and a filling step of filling the alternative refrigerant into the new air-conditioning unit. The circulating amount of refrigerant in the new air-conditioning unit is increased so as to be larger than that in the previous air-conditioning unit, and the heat exchange capacity per unit volume of each of the indoor heat exchanger and the outdoor heat exchanger is made larger than that before the renewal.

11 Claims, 9 Drawing Sheets

(51) Int. Cl.
*B61D 17/12* (2006.01)
*B61D 27/00* (2006.01)

(52) U.S. Cl.
CPC ......... *B61D 17/12* (2013.01); *B61D 27/0072* (2013.01); *B60H 2001/00235* (2013.01); *F25B 2400/18* (2013.01)

(58) Field of Classification Search
CPC .... Y10T 137/0419; B60H 2001/00235; B60H 1/00371; B60H 1/00585
USPC ..................................................... 62/77, 292
See application file for complete search history.

(56) References Cited

U.S. PATENT DOCUMENTS

| | | | |
|---|---|---|---|
| 6,295,826 B1 | 10/2001 | Lee | |
| 6,510,698 B2* | 1/2003 | Kasai | F25B 13/00 62/292 |
| 7,032,399 B2* | 4/2006 | Czechowicz | B60H 1/00535 224/326 |
| 9,126,293 B2* | 9/2015 | Uto | B60H 1/00535 |
| 2002/0026800 A1* | 3/2002 | Kasai | F25B 13/00 62/85 |
| 2003/0110787 A1* | 6/2003 | Koehler | B60H 1/00371 62/244 |
| 2003/0196449 A1* | 10/2003 | Fujita | C09K 5/045 62/468 |
| 2006/0150664 A1* | 7/2006 | Yoshimi | F25B 45/00 62/475 |
| 2008/0245503 A1* | 10/2008 | Wilson | B60H 1/00371 165/42 |
| 2008/0256968 A1* | 10/2008 | Hassel | B60H 1/00371 62/244 |
| 2013/0112282 A1* | 5/2013 | Uto | B60H 1/00535 137/15.01 |

FOREIGN PATENT DOCUMENTS

| | | | | |
|---|---|---|---|---|
| JP | 05016654 A | * | 1/1993 | |
| JP | 5-46511 U | | 6/1993 | |
| JP | H07-083545 A1 | | 3/1995 | |
| JP | 11-304293 A | | 11/1999 | |
| JP | 2000-146322 A | | 5/2000 | |
| JP | 2000-274982 A | | 10/2000 | |
| JP | 2001-355928 A | | 12/2001 | |
| JP | 2001355928 A | * | 12/2001 | |
| JP | 2002031387 A | * | 1/2002 | ............. F24F 11/02 |
| JP | 2002-277114 A | | 9/2002 | |
| JP | 2007-187407 A | | 7/2007 | |
| JP | 2008-151386 A | | 7/2008 | |
| JP | 2008-162438 A | | 7/2008 | |
| JP | 2009222363 A | * | 10/2009 | |
| JP | 2010-127531 A | | 6/2010 | |
| WO | WO 2006/021226 A1 | | 3/2006 | |

OTHER PUBLICATIONS

Mar. 13, 2014 Extended European Search Report issued in European Application No. 10856937.7.
"R744, En Remplacement Du R134A", Revue Technique Diesel, Etai, Boulogne Billancourt, Fr, vol. 42, No. 257, Jan. 1, 2006, pp. 20-21, XP001244134.
Huenemoerder, W., "Concerns about C02 A/C/ Systems for Compact Vehicles and their Solutions", VDA Alternate Refrigerant Winter Meeting, Feb. 23, 2005, pp. 1-18, XP001228008.
"Alternative Refrigerants", Automotive Engineering, Society of Automotive Engineers. Warrendale, US, vol. 109, No. 12, Dec. 1, 2001, pp. 71-76, XP001112359.
Office Action (Notice of Reasons for Refusal) dated Dec. 10, 2013, by the Japanese Patent Office in corresponding Japanese Patent Applicaiton No. 2012-532742, and as English Translation of the Office Action. (6 pages).
Nov. 3, 2014 Chinese Office Action issued in Chinese Application No. 201080069027.6 (with English language translation).
*International Search Report (PCT/ISA/210) dated Oct. 5, 2010, by the Japanese Patent Office as the International Searching Authority for International Application No. PCT/JP2010/005557.

* cited by examiner

OPERATION STATE OF AIR-CONDITIONING UNIT
FOR VEHICLE 100b AFTER RENEWAL

RENEWAL METHOD OF AIR-CONDITIONING UNIT FOR VEHICLE AND AIR-CONDITIONING UNIT FOR VEHICLE

TECHNICAL FIELD

The present invention relates to a renewal method of an air-conditioning unit for vehicle that is mounted on a vehicle and to an air-conditioning unit for vehicle.

BACKGROUND ART

Hitherto, chlorofluorocarbon (CFC) and hydrochlorofluorocarbon (HCFC) have been used as refrigerants for air-conditioning apparatuses (refrigeration and air-conditioning apparatuses). However, because chlorine included in the molecule of these refrigerants deplete the ozone layer in the stratosphere, CFC has already been abolished completely and regulation of production of HCFC has begun.

Alternatively, air-conditioning units that employ hydrofluorocarbon (HFC) that does not include any chlorine in its molecule are put into practical. When an air-conditioning unit using CFC or HCFC becomes deteriorated, since these refrigerants are abolished or regulation is imposed on production thereof, renewal to an air-conditioning unit using HFC is required.

Further, overhauling including renewal of the compressor needs to be periodically performed to maintain the air-conditioning unit. In such an instance, the air-conditioning unit is required to be renewed to one using HFC.

As such an air-conditioning unit, for example, there has been proposed an air-conditioning apparatus "using, as an alternative of the conventional R22 refrigerant, a HFC refrigerant, such as a R410A refrigerant that has a higher saturation pressure at a same temperature, as the refrigerant that is filled in the refrigeration cycle" (see Patent Literature 1, for example).

CITATION LIST

Patent Literature

Patent Literature 1: Japanese Unexamined Patent Application

SUMMARY OF INVENTION

Technical Problem

Compared to HCFC refrigerants, HFC refrigerants such as R407C and R410A have lower efficiency and pressure is higher during operation. In order to avert this, the components of the air-conditioning unit that uses HFC refrigerants may be increased in size.

However, in an air-conditioning unit for vehicle that is included in a frame mounted on a vehicle, the air-conditioning unit for vehicle needs to be shaped so that it can fit in the frame after the renewal. That is, the air-conditioning unit after the renewal is restricted by the size of the existing frame, and the components cannot be increased in size.

Accordingly, when an air-conditioning unit for vehicle using HFC is renewed without any increase in size, there has been a problem in that the air-conditioning capacity drops compared to that before the renewal.

Further, since pressure during operation becomes higher, a problem such as drop in the maximum value of outside air temperature allowing operation thereof is encountered.

Reduction of time it takes for changing the design from the existing air-conditioning unit for vehicle and shortening of the period of the renewing work when renewing the air-conditioning unit for vehicle are anticipated.

In a vehicle disposed with a plurality of air-conditioning units for vehicle, when one or some of the air-conditioning units for vehicle is renewed, there are cases in which air-conditioning units for vehicle using HCFC and ones using HFC co-exist. Prevention of operational error during renewal work and improvement of workability are anticipated in such cases.

The invention has been made for solving the above problems and a main object thereof is to obtain a renewal method of an air-conditioning unit for vehicle that is shaped so as to allow the air-conditioning unit for vehicle to fit in a frame without increasing its size and that is capable of obtaining an air-conditioning capacity that is equivalent to that before the renewal and to obtain such an air-conditioning unit for vehicle.

In addition, another object of the invention is to obtain a renewal method of an air-conditioning unit for vehicle that can reduce time it takes to change the design from the air-conditioning unit for vehicle before the renewal and to obtain such an air-conditioning unit for vehicle.

Further, still another object is to obtain a renewal method of an air-conditioning unit for vehicle that can shorten the period of the renewing work and to obtain such an air-conditioning unit for vehicle.

Further, yet still another object is to obtain a renewal method of an air-conditioning unit for vehicle that can prevent operational error during renewal work and improve workability and to obtain such an air-conditioning unit for vehicle.

Solution to Problem

The renewal method of the air-conditioning unit for vehicle according to the invention is a renewal method of an air-conditioning unit for vehicle in which a first air-conditioning unit using a first refrigerant disposed in a frame mounted on a vehicle is renewed to a second air-conditioning unit using a second refrigerant, the renewal method including:

a removal step of removing the first air-conditioning unit from the frame, the first air-conditioning unit including a first compressor, a first heat source side heat exchanger, first pressure reducing means, and a first use side heat exchanger, and removing a connecting wire of an inverter driving the first compressor from the first compressor;

an assembly step of disposing the first air-conditioning unit in the frame, the second air-conditioning unit including a second compressor, a second heat source side heat exchanger, second pressure reducing means, and a second use side heat exchanger and configured so as to be capable of fitting in the frame, and attaching the connecting wire of the inverter to the second compressor;

a filling step of filling the second refrigerant into the second air-conditioning unit that has been disposed in the frame; and a settings changing step of changing a way of a control for the inverter such that a circulating amount of refrigerant in the second air-conditioning unit is larger than a circulating amount of refrigerant in the first air-conditioning unit, and adding a control for the circulating amount of the refrigerant of the second air-conditioning unit on the basis of at least one value measured by a pressure sensor and an outside air temperature sensor provided on discharge side of the second compressor.

The air-conditioning unit for vehicle according to the invention is an air-conditioning unit for vehicle that is disposed in a frame as an alternative of a first air-conditioning unit that circulates a first refrigerant by connecting a first compressor, a first heat source side heat exchanger, first pressure reducing means, and a first use side heat exchanger and that is disposed in the frame mounted on a vehicle, the air-conditioning unit for vehicle including:

a refrigerant circuit circulating a second refrigerant by connecting a second compressor, a second heat source side heat exchanger, second pressure reducing means, and a second use side heat exchanger;

a controller controlling a inverter driving the second compressor such that a circulating amount of refrigerant in the refrigerant circuit is larger than a circulating amount of refrigerant in the first air-conditioning unit, and controlling the circulating amount of the refrigerant of the refrigerant circuit on the basis of at least one value measured by a pressure sensor and an outside air temperature sensor provided on discharge side of the second compressor.

Advantageous Effects of Invention

The invention is capable of obtaining an air-conditioning capacity that is equivalent to that before the renewal while allowing the air-conditioning unit for vehicle after the renewal to fit in an existing frame.

DESCRIPTION OF EMBODIMENTS

Figure 1:
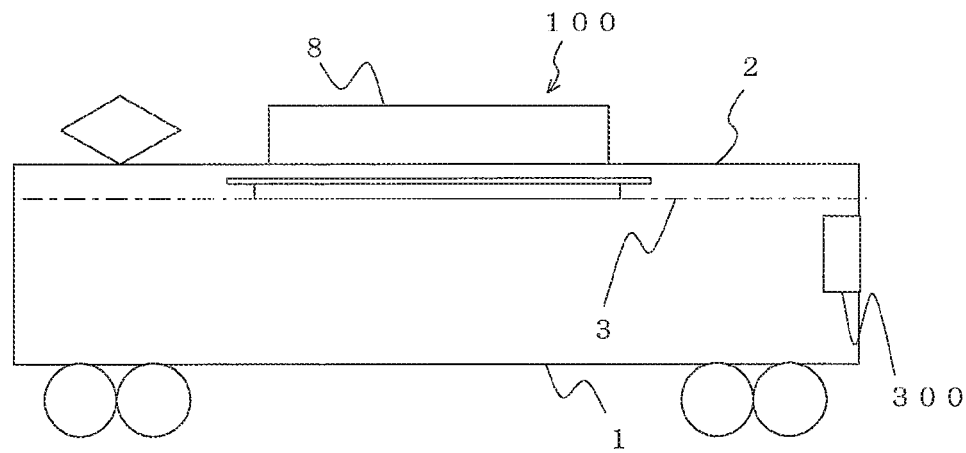
FIG. 1 is a longitudinal sectional view illustrating a schematic configuration of a vehicle 1 mounted with an air-conditioning unit for vehicle 100 according to Embodiment 1.

Embodiments of the invention will be described below with reference to the drawings.

Note that the dimensional relationships of each component in the drawings below may be different from the actual ones.

Embodiment 1

[Configuration of Air-Conditioning Unit for Vehicle]

The configuration of an air-conditioning unit for vehicle 100 to which a renewal method of an air-conditioning unit for vehicle according to Embodiment 1 is applied will now be described.

FIG. 1 is a longitudinal sectional view illustrating a schematic configuration of a vehicle 1 mounted with the air-conditioning unit for vehicle 100 according to Embodiment 1.

Figure 2:
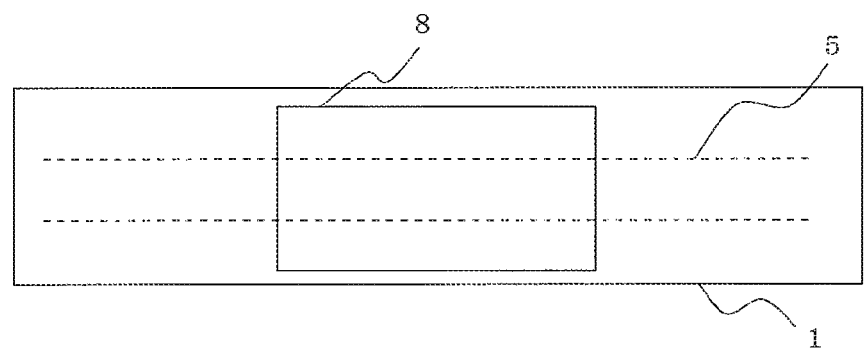
FIG. 2 is a plan view of the vehicle 1 mounted with the air-conditioning unit for vehicle 100 according to Embodiment 1.

FIG. 2 is a plan view of the vehicle 1 mounted with the air-conditioning unit for vehicle 100 according to Embodiment 1.

Figure 3:
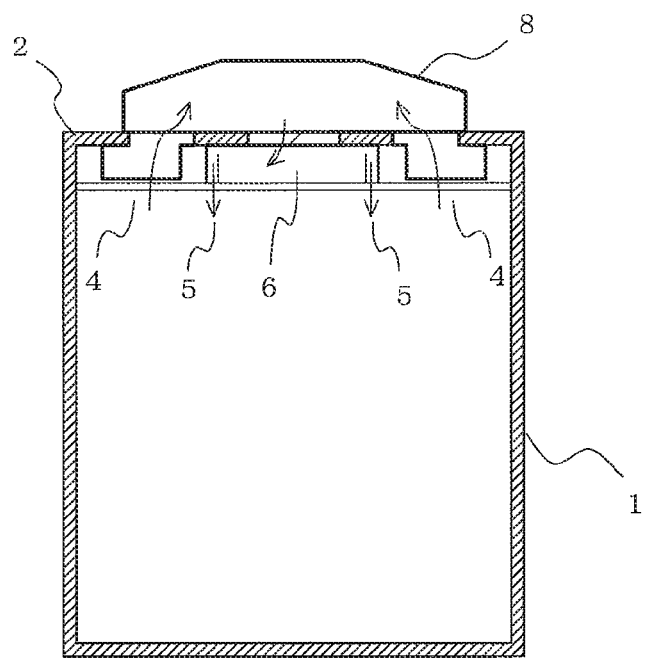
FIG. 3 is a cross-sectional view of a main section of the vehicle 1 mounted with the air-conditioning unit for vehicle 100 according to Embodiment 1.

FIG. 3 is a cross-sectional view of a main section of the vehicle 1 mounted with the air-conditioning unit for vehicle 100 according to Embodiment 1.

In FIGS. 1 to 3, a frame 8 is mounted on the roof 2 of the vehicle 1. The air-conditioning unit for vehicle 100 is housed in the frame 8.

Further, a ceiling 3 disposed in the vehicle 1 is formed with inlet ports 4 near the side portion and is formed with outlet ports 5 near the center portion.

The frame 8 is in communication with the inside of the vehicle 1 through the inlet ports 4 and the outlet ports 5.

The air-conditioning unit for vehicle 100 takes in air inside the vehicle 1 from the inlet ports 4 and discharges air-conditioned air into the vehicle 1 from the outlet ports 5.

Further, a duct 6 is formed between the ceiling 3 of the vehicle 1 and the base plate of the frame 8. The duct 6 forms air passages of the air discharged from the air-conditioning unit for vehicle 100.

Note that in Embodiment 1, although a case in which the frame 8 is mounted on the roof 2 of the vehicle 1 is described, the invention is not limited to this. For example, the frame 8 may be mounted on the bottom of the vehicle 1.

Figure 4:
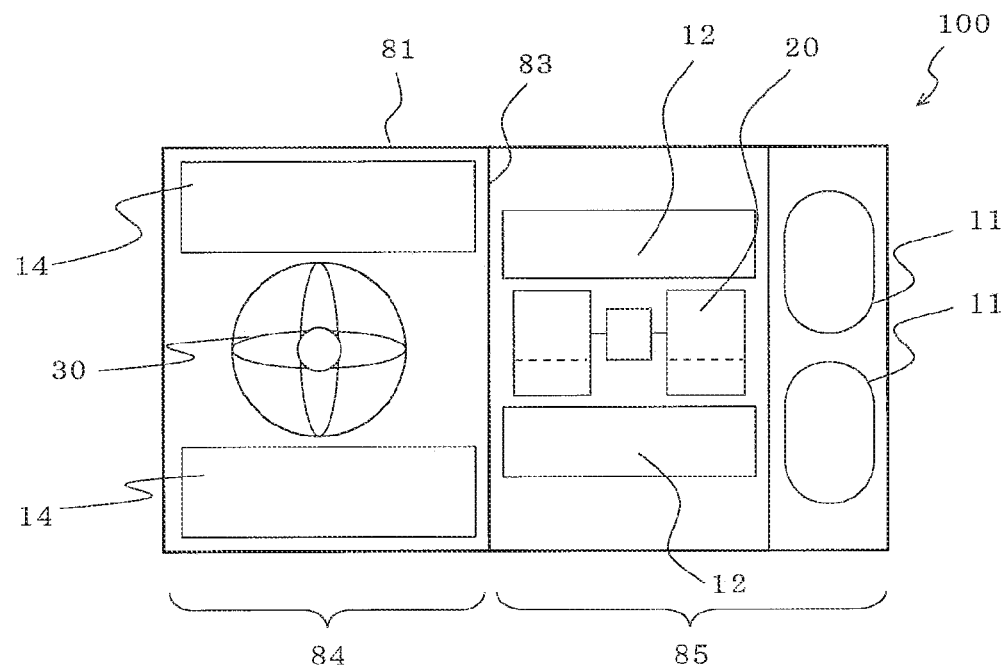
FIG. 4 is a schematic plan view of the air-conditioning unit for vehicle 100 according to Embodiment 1.

FIG. 4 is a schematic plan view of the air-conditioning unit for vehicle 100 according to Embodiment 1.

Figure 5:
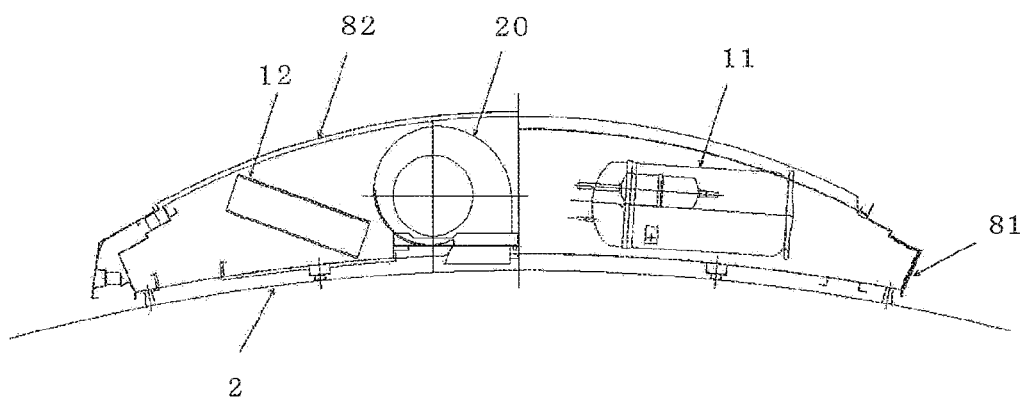
FIG. 5 is a cross-sectional view of a main section of the air-conditioning unit for vehicle 100 according to Embodiment 1.

FIG. 5 is a cross-sectional view of a main section of the air-conditioning unit for vehicle 100 according to Embodiment 1.

Note that the left half of FIG. 5 illustrates a cross-sectional view that has been cut away at the position where indoor heat exchangers 12 are disposed in FIG. 4. Further, the right half of FIG. 5 illustrates a cross-sectional view that has been cut away at the position where compressors 11 are disposed in FIG. 4. Note that FIG. 4 illustrates a state in which a top cover 82 has been removed.

As shown in FIGS. 4 and 5, the frame 8 forms an outer shell with side covers 81 and the top cover 82.

Further, in the frame 8, an outdoor unit section 84 and an indoor unit section 85 is sectionally formed with a partition plate 83.

The outdoor unit section 84 is disposed with outdoor heat exchangers 14 and an outdoor fan 30 that constitute the air-conditioning unit for vehicle 100.

The indoor unit section 85 is disposed with the compressors 11, the indoor heat exchangers 12, and an indoor fan 20 that constitute the air-conditioning unit for vehicle 100.

Note that the example of FIG. 4 describes an exemplary case in which two compressors 11, two indoor heat exchangers 12, and two outdoor heat exchangers 14 are built-in.

Further, in the example of FIG. 4, the indoor fan 20 is shared by the two indoor heat exchangers 12. The outdoor fan 30 is shared by the two outdoor heat exchangers 14.

Figure 6:
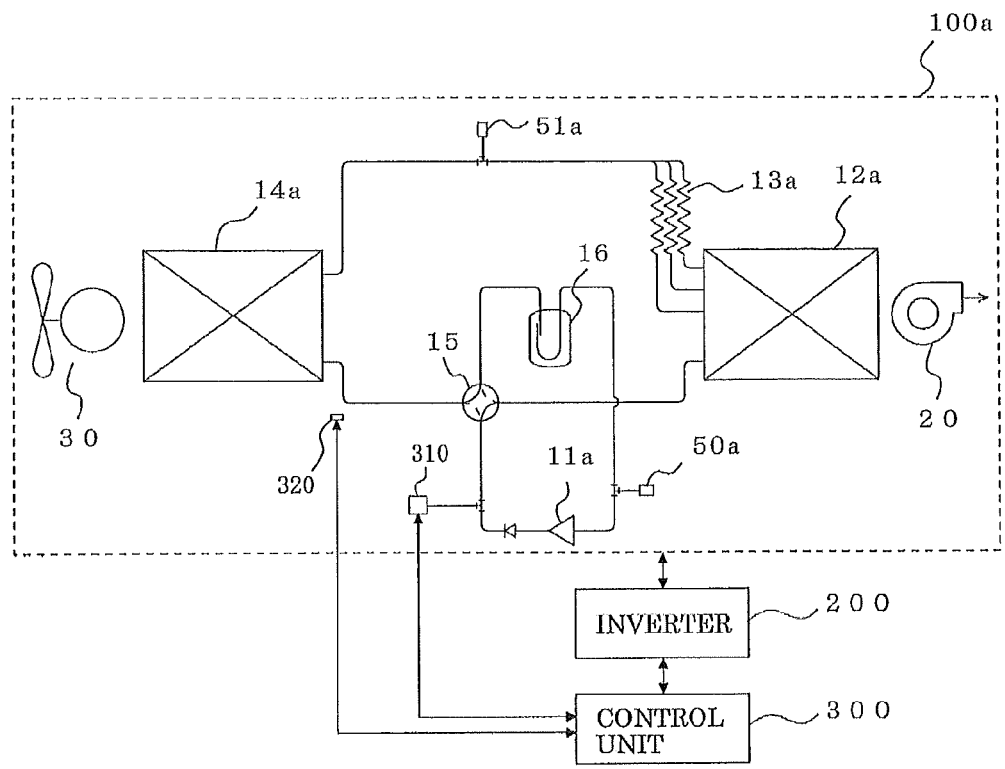
FIG. 6 is a refrigerant circuit diagram of an air-conditioning unit for vehicle 100a before renewal according to Embodiment 1.

FIG. 6 is a refrigerant circuit diagram of an air-conditioning unit for vehicle 100a before renewal according to Embodiment 1.

Note that in the subsequent description, the components of the air-conditioning unit for vehicle 100 before the renewal are attached with a suffix "a" and the components of the air-conditioning unit for vehicle 100 after the renewal are attached with a suffix "b", so as to distinguish the components before and after the renewal. Note that components that are the same before and after the renewal are attached with no suffix.

Referring to FIG. 6, the air-conditioning unit for vehicle 100a forms a refrigerant circuit that circulates a refrigerant by sequentially connecting with refrigerant pipes a compressor 11a, a four-way valve 15, an indoor heat exchanger 12a, pressure reducing means 13a, an outdoor heat exchanger 14a, and an accumulator 16.

The refrigerant circuit of the air-conditioning unit for vehicle 100a before the renewal is filled therein with a HCFC refrigerant (hereinafter, referred to as a "former refrigerant") such as, for example, R22.

Note that the "air-conditioning unit for vehicle 100a" of Embodiment 1 corresponds to a "first air-conditioning unit" of the invention.

The "compressor 11a" of Embodiment 1 corresponds to a "first compressor" of the invention.

The "outdoor heat exchanger 14a" of Embodiment 1 corresponds to a "first heat source side heat exchanger" of the invention.

The "pressure reducing means 13a" of Embodiment 1 corresponds to "first pressure reducing means" of the invention.

The "indoor heat exchanger 12a" of Embodiment 1 corresponds to a "first use side heat exchanger" of the invention.

The "former refrigerant" corresponds to a "first refrigerant" of the invention.

The "refrigerant pipe" constituting the refrigerant circuit of the air-conditioning unit for vehicle 100a corresponds to a "first pipe" of the invention.

The compressor 11a compresses the refrigerant and discharges it therefrom. This compressor 11a is driven by a motor that is controlled by an inverter 200.

The operating frequency of the inverter 200 is controlled by a control unit 300.

The four-way valve 15 is a valve that switches the flow direction of the refrigerant.

This four-way valve 15 switches between a cooling operation and a heating operation.

During the cooling operation, the outdoor heat exchanger 14a is made to function as a condenser of the refrigerant and the indoor heat exchanger 12a is made to function as an evaporator of the refrigerant.

During the heating operation, the outdoor heat exchanger 14a is made to function as an evaporator of the refrigerant and the indoor heat exchanger 12a is made to function as a condenser of the refrigerant.

Note that in Embodiment 1, although a configuration in which the four-way valve 15 allows switching between the cooling and heating operation is described, the invention is not limited to this. There may be no four-way valves 15 and the operation may be either the cooling operation or the heating operation alone.

The indoor heat exchanger 12a is, for example, a cross-fin type fin-and-tube heat exchanger including a heat transfer pipe and a plurality of fins.

This indoor heat exchanger 12a functions as an evaporator of the refrigerant during the cooling operation and cools the air inside the vehicle and functions as a condenser of the refrigerant during the heating operation and heats the air inside the vehicle.

The indoor fan 20 draws in the air inside the vehicle 1 into the indoor unit section 85 of the frame 8. Further, the indoor fan 20 supplies air that has exchanged heat with the refrigerant by means of the indoor heat exchanger 12a in the indoor unit section 85 into the vehicle 1.

The pressure reducing means 13 includes a single or a plurality of capillaries (capillary tubes), for example. The pressure reducing means 13 decompresses the refrigerant flowing in the refrigerant circuit.

Note that the pressure reducing means 13 is not limited to a capillary and may be a variable expansion valve and the like.

The outdoor heat exchanger 14a is, for example, a cross-fin type fin-and-tube heat exchanger including a heat transfer pipe and a plurality of fins.

This outdoor heat exchanger 14a functions as a condenser of the refrigerant during the cooling operation and functions as an evaporator of the refrigerant during the heating operation.

The indoor fan 20 draws in the air inside the vehicle 1 into the indoor unit section 85 of the frame 8. Further, the indoor fan 20 supplies air that has exchanged heat with the refrigerant by means of the indoor heat exchanger 12a in the indoor unit section 85 into the vehicle 1.

The outdoor fan 30 draws in outside air into the outdoor unit section 84 of the frame 8. Further, the outdoor fan 30 discharges air that has exchanged heat with the refrigerant by means of the outdoor heat exchanger 14a in the outdoor unit section 84 out of the vehicle 8.

The accumulator 16 is provided on the suction side of the compressor 11a and retains liquid refrigerant.

Note that although Embodiment 1 describes a configuration in which the accumulator 16 is provided, the invention is not limited to this and the accumulator 16 may be omitted.

The refrigerant pipes constituting the refrigerant circuit is provided with a refrigerant recovery port 50a and a refrigerant filling port 51a for filling the refrigerant. The refrigerant recovery port 50a is provided on the suction side of the compressor 11a, for example, and the refrigerant filling port 51a is provided in the liquid line between the indoor heat exchanger 12a and the outdoor heat exchanger 14a.

Note that the positions to provide the refrigerant recovery port 50a and the refrigerant filling port 51a are not limited to the above.

Note that the refrigerant recovery port 50a and the refrigerant filling port 51a may each be provided at plural positions. The refrigerant recovery port 50a and the refrigerant filling port 51a that are used have the same bore. Further, even when plural refrigerant recovery ports 50a and refrigerant filling ports 51a are provided, ones with the same bore are used.

A pressure sensor 310 that measures the pressure of the refrigerant is provided on a discharge side of the compressor 11a. Although Embodiment 1 describes a configuration in which the pressure sensor 310 is provided, the invention is not limited to this and may alternatively include a pressure switch.

A temperature sensor 320 that measures the temperature of the outside air that exchanges heat with the outdoor heat exchanger 14a is provided near the outdoor heat exchanger 14a. Although Embodiment 1 describes a configuration in which the temperature sensor 320 is provided, the invention is not limited to this and the temperature sensor may be omitted.

The control unit 300 controls the operating frequency of the inverter 200 on the basis of at least either of the measurement result of the pressure sensor 310 and the temperature sensor 320.

Further, the control unit 300 controls the indoor fan 20, the outdoor fan 30, and the four-way valve 15 on the basis of the measurement results of the pressure sensor 310 and the temperature sensor 320, the operation settings input from the operation means (not shown), and the like.

This control unit 300 includes a microcomputer, for example, and operates according to preset information.

Note that the control unit 300 may be devised as software that is implemented on an arithmetic unit or may be devised as hardware such as a circuit device that implements these functions.

The "control unit 300" of Embodiment 1 corresponds to "inverter control means" of the invention.

The configuration of the air-conditioning unit for vehicle 100 to which the renewal method of the air-conditioning unit for vehicle according to Embodiment 1 is applied has been described above.

Subsequently, the renewal method of the air-conditioning unit for vehicle will be described in which the air-conditioning unit for vehicle 100a disposed in the frame 8 mounted on the vehicle 1 is renewed to an air-conditioning unit for vehicle 100b that uses HFC refrigerants such as R407C, R410A, or the like (hereinafter, referred to as an "alternative refrigerant").

[Renewal Method of Air-Conditioning Unit for Vehicle]

The renewal method of the air-conditioning unit for vehicle includes (1) a removal step, (2) an assembly step, and (3) a filling step. Each step will be described below.

(1) Removal Step

A refrigerant recovering device is connected to the refrigerant filling port 51a and the refrigerant recovery port 50a in the refrigerant circuit of the air-conditioning unit for vehicle 100a to recover the refrigerant. After recovering the refrigerant, among the components of the air-conditioning unit for vehicle 100a, at least the compressor 100a, the outdoor heat exchanger 14a, the pressure reducing means 13a, and the indoor heat exchanger 12a, as well as the refrigerant pipes that connect these components are removed from the frame 8.

Further, the connecting wire of the inverter 200 is detached from the compressor 11a.

Note that in addition to this, the four-way valve 15, the accumulator 16, the indoor fan 20, the outdoor fan 30, and the like that are used after the renewal to the air-conditioning unit for vehicle 100b may be removed and be cleaned or the parts thereof may be replaced.

The removal step of removing the air-conditioning unit for vehicle 100a from the frame 8 is completed as above.

(2) Assembly Step

First, the configuration of the air-conditioning unit for vehicle 100b after the renewal will be described.

Figure 7:
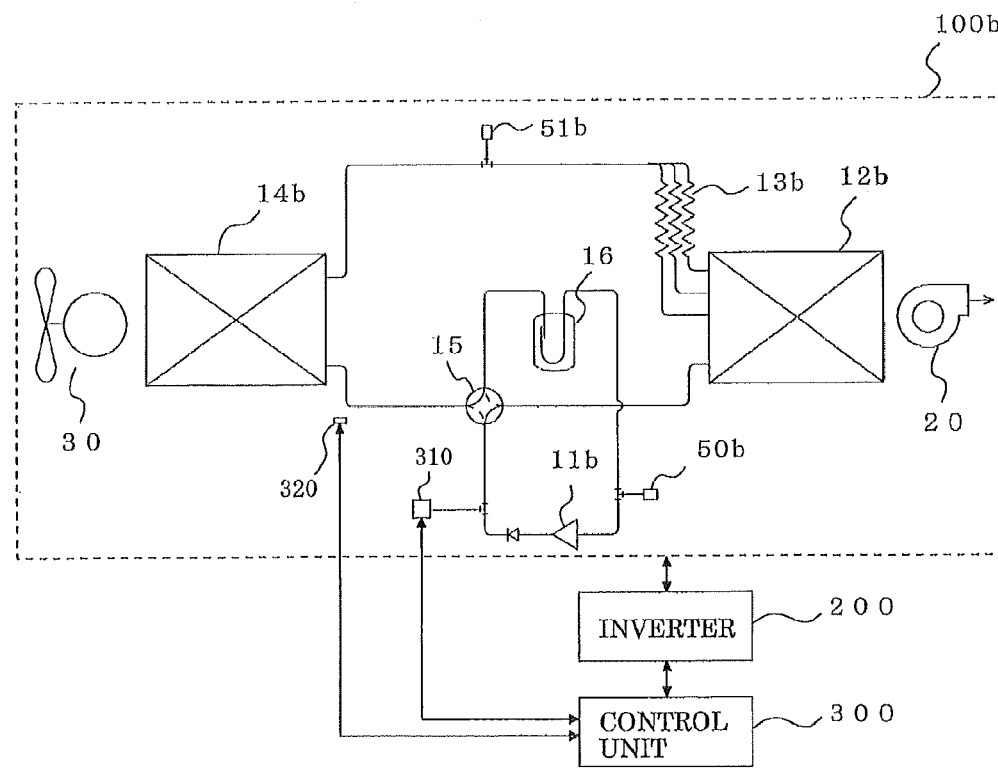
FIG. 7 is a refrigerant circuit diagram of an air-conditioning unit for vehicle 100b after the renewal according to Embodiment 1.

FIG. 7 is a refrigerant circuit diagram of the air-conditioning unit for vehicle 100b after the renewal according to Embodiment 1.

Referring to FIG. 7, a compressor 11b is a compressor for alternative refrigerants in which the used refrigerating machine oil and the like is adaptable to the alternative refrigerant.

An indoor heat exchanger 12b is a heat exchanger in which its heat exchange capacity per unit volume is larger than or the same as that of the indoor heat exchanger 12a. For example, in a case in which the indoor heat exchanger 12b includes a heat transfer pipe, the pipe diameter of the heat transfer pipe is smaller than the pipe diameter of the heat transfer pipe included in the indoor heat exchanger 12a and, thus, the indoor heat exchanger 12b has a structure with higher density.

An outdoor heat exchanger 14b is a heat exchanger in which its heat exchange capacity per unit volume is larger than that of the outdoor heat exchanger 14a. For example, in a case in which the outdoor heat exchanger 14b includes a heat transfer pipe, the pipe diameter of the heat transfer pipe is smaller than the pipe diameter of the heat transfer pipe included in the outdoor heat exchanger 14a and, thus, the outdoor heat exchanger 14b has a structure with higher density.

Further, compared to the pressure reducing means 13a, pressure reducing means 13b is configured such that it is applicable to increase in operating pressure of the refrigerant.

Note that the pressure reducing means 13a of the air-conditioning unit for vehicle 100a may not be renewed and may be used in the refrigerant circuit of the air-conditioning unit for vehicle 100b.

Compared with the refrigerant pipes of the air-conditioning unit for vehicle 100a, the refrigerant pipes included in the refrigerant circuit of the air-conditioning unit for vehicle 100b are configured to be applicable to the same operating pressure of the refrigerant or applicable to increase in the operating pressure of the refrigerant.

For example, refrigerant pipes with a larger pipe thickness then that of the air-conditioning unit for vehicle 100a are used in the air-conditioning unit for vehicle 100b.

A refrigerant filling port 51b that has a different bore to that of the refrigerant filling port 51a provided in the air-conditioning unit for vehicle 100a is used.

Note that the refrigerant filling port 51b may be provided at plural positions. When providing a plurality of refrigerant filling ports 51b, all of the refrigerant filling ports 51b are to have the same bore.

Note that the four-way valve 15, the accumulator 16, the indoor fan 20, and the outdoor fan 30 are also used in the refrigerant circuit of the air-conditioning unit for vehicle 100b without renewing the components of the air-conditioning unit for vehicle 100a.

Note that the configuration may be such that the four-way valve 15 and the accumulator 16 are omitted.

Further, the inverter 200, the control unit 300, the pressure sensor 310, and the temperature sensor 320 are also used in the refrigerant circuit of the air-conditioning unit for vehicle 100b without renewing the components of the air-conditioning unit for vehicle 100a.

Note that in Embodiment 1, although a description is given of a case in which a portion of the components of the air-conditioning unit for vehicle 100a is used in the renewed air-conditioning unit for vehicle 100b, the invention is not limited to this case. For example, particular components other than the above components or all of the components may be renewed.

In the above configuration, the compressor 11b, the outdoor heat exchanger 14b, and the indoor heat exchanger 12b are configured such that their sizes are substantially the same or smaller than the compressor 11a, the outdoor heat exchanger 14a, and the indoor heat exchanger 12a, respectively.

Accordingly, the air-conditioning unit for vehicle 100b is configured so as to be capable of fitting in the frame 8.

Note that the "air-conditioning unit for vehicle 100b" of Embodiment 1 corresponds to a "second air-conditioning unit" of the invention.

The "compressor 11b" of Embodiment 1 corresponds to a "second compressor" of the invention.

The "outdoor heat exchanger 14b" of Embodiment 1 corresponds to a "second heat source side heat exchanger" of the invention.

The "pressure reducing means 13b" of Embodiment 1 corresponds to "second pressure reducing means" of the invention.

The "indoor heat exchanger 12b" of Embodiment 1 corresponds to a "second use side heat exchanger" of the invention.

The "alternative refrigerant" of Embodiment 1 corresponds to a "second refrigerant" of the invention.

The "refrigerant pipe" constituting the refrigerant circuit of the air-conditioning unit for vehicle 100b corresponds to a "second pipe" of the invention.

The procedure of the step will now be described. Note that the order of the procedure is not limited to this.

The air-conditioning unit for vehicle 100b that is configured so as to be capable of fitting in the frame 8 is disposed in the frame 8.

The compressor 11b, the four-way valve 15, the indoor heat exchanger 12b, the pressure reducing means 13b, the outdoor heat exchanger 14b, and the accumulator 16 are sequentially connected by refrigerant pipes.

The connecting wire of the inverter 200 is attached to the compressor 11b.

The control of the control unit 300 is changed such that the operating frequency of the inverter 200 is higher than when the compressor 11a had been controlled.

For example, the operating frequency of the inverter 200 is changed such that its frequency is increased by 5 to 10% compared to that before the renewal.

As such, by increasing the operating frequency, the circulating amount of refrigerant in the refrigerant circuit of the air-conditioning unit for vehicle 100b is increased when compared to that of the circulating amount of refrigerant in the refrigerant circuit of the air-conditioning unit for vehicle 100a.

As regards the settings change, for example, the information content of software or the like that is preset in the control unit 300 is changed so as to change the control of the control unit 300.

Note that the settings change is not limited to the above. For example, the circuit device or the like constituting the control unit 300 may be replaced so as to change the settings.

The assembly step of disposing the air-conditioning unit for vehicle 100b, which is configured so as to be capable of fitting in the frame 8, in the frame 8 is completed as above.

Note that in Embodiment 1, although a description is given of a case in which the circulating amount of refrigerant is increased by increasing the operating frequency of the inverter 200, the invention is not limited to this; it is only sufficient that the circulating amount of refrigerant in the refrigerant circuit of the air-conditioning unit for vehicle 100b is larger than the circulating amount of refrigerant in the refrigerant circuit of the air-conditioning unit for vehicle 100a.

For example, the circulating amount of refrigerant may be increased without increasing the operating frequency by using a compressor 11b having a size that is the same or smaller than the compressor 11a and that has a larger refrigerant discharge capacity than the compressor 11a.

In addition to using a compressor 11b that has a larger refrigerant discharge capacity, the operating frequency may be increased as well.

Note that in Embodiment 1, although a description is given of a case in which the frame 8 mounted on the vehicle 1 before and after the renewal is the same, the invention is not limited to this.

For example, the frame 8 before the renewal itself may be renewed to a frame with a substantially same shape. Further, the frame may be renewed to one having a shape compatible with the inlet ports 4 and the outlet ports 5 (including the duct 6) of the vehicle 1.

(3) Filling Step

Figure 8:
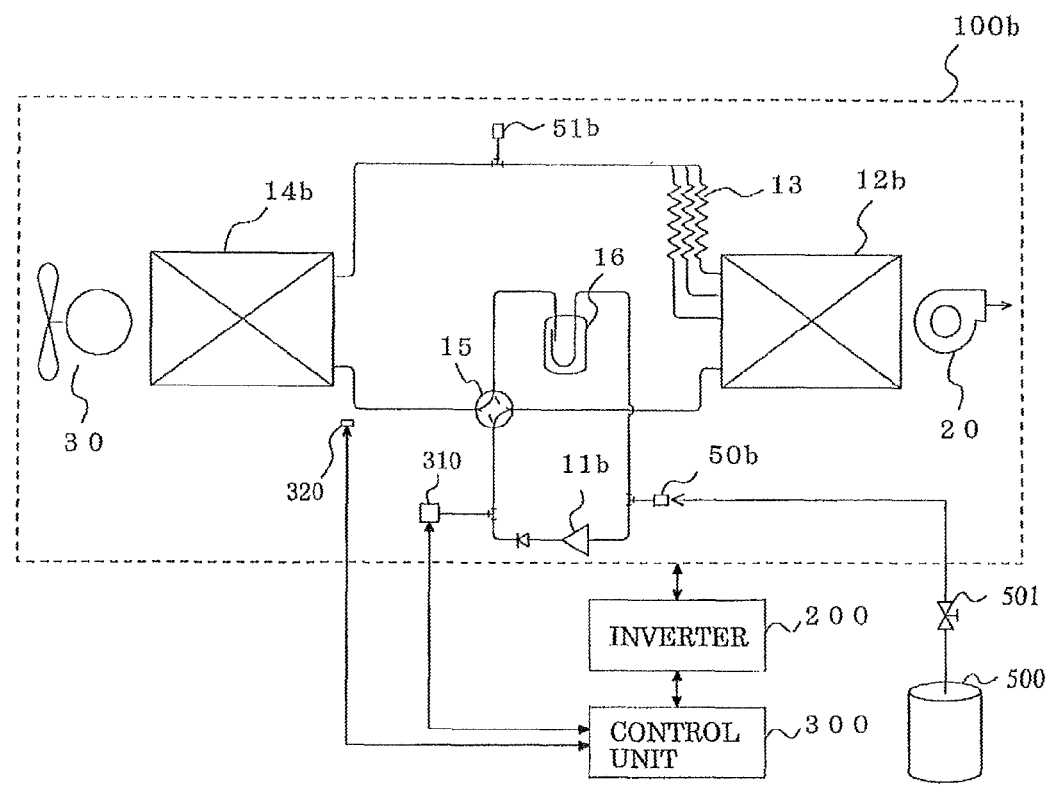
FIG. 8 is a refrigerant circuit diagram of a filling step according to Embodiment 1.

FIG. 8 is a refrigerant circuit diagram of a filling step according to Embodiment 1.

Air and water content in the refrigerant pipes are removed by vacuuming inside the refrigerant circuit of the air-conditioning unit for vehicle 100b.

The refrigerant filling port 51b that is provided in the air-conditioning unit for vehicle 100b and a refrigerant supply device 500 that supplies the alternative refrigerant are connected with a refrigerant filling hose, for example. The refrigerant supply device 500 includes a gas cylinder or the like having an on-off valve 501.

Note that the connection of the refrigerant recovery/filling hose has a bore that allows connection to the refrigerant recovery port 50a and the refrigerant filling port 51b.

Next, the on-off valve 501 of the refrigerant supply device 500 is opened and the alternative refrigerant is filled into the refrigerant circuit of the air-conditioning unit for vehicle 100b from the refrigerant supply device 500.

After the filling is completed, the on-off valve 501 is closed and the refrigerant filling port 51b and the refrigerant supply device 500 are disconnected.

As above, the filling step of filling the alternative refrigerant into the air-conditioning unit for vehicle 100b is completed.

The renewal method of the air-conditioning unit for vehicle according to Embodiment 1 has been described.

Subsequently, comparison of the operating states before and after the renewal and its effects will be described.

Figure 9:
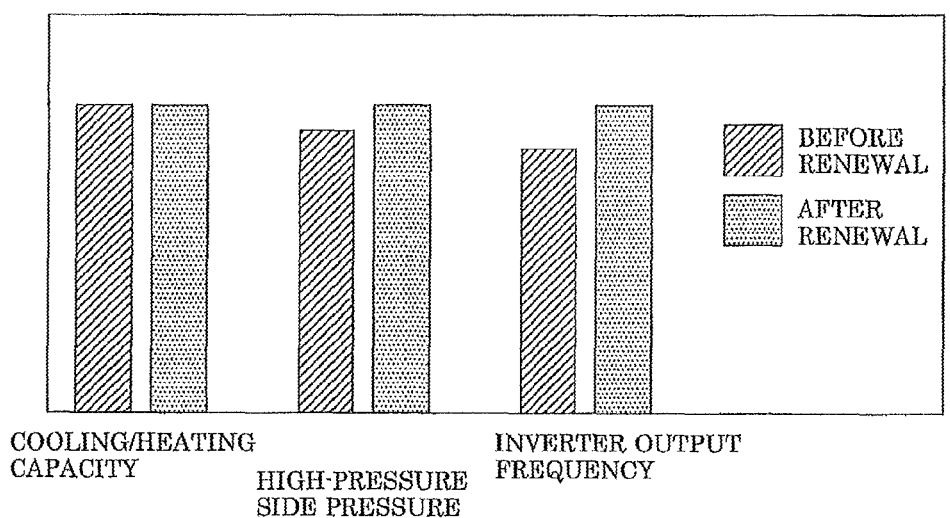
FIG. 9 is a diagram describing the operating states before and after the renewal according to Embodiment 1.

FIG. 9 is a diagram describing the operating states before and after the renewal according to Embodiment 1.

As shown in FIG. 9, the air-conditioning unit for vehicle 100b after the renewal obtains an equal cooling/heating capacity to that before the renewal.

As above, since the circulating amount of refrigerant in the refrigerant circuit is increased, even when the air-conditioning unit for vehicle 100b is configured so as to be capable of fitting in the frame 8 without increasing its size and even when the alternative refrigerant that is lower in efficiency than the former refrigerant is used, cooling/heating capacity that is equivalent to that before the renewal can be obtained.

Further, the heat exchange capacity per unit volume of each of the indoor heat exchanger 12b and the outdoor heat exchanger 14b are made larger compared to that before the renewal. Accordingly, it is possible to obtain a heat exchange capacity equivalent to that before the renewal even when using the alternative refrigerant and without increasing the sizes of the indoor heat exchanger 12b and the outdoor heat exchanger 14b. Therefore, it is possible to obtain a cooling/heating capacity equivalent to that before the renewal.

Further, the pipe diameters of the heat transfer pipes of the indoor heat exchanger 12b and the outdoor heat exchanger 14b are made smaller compared to that before the renewal. Accordingly, it is possible to reduce the sizes of the indoor heat exchanger 12b and the outdoor heat exchanger 14b while obtaining the heat exchange capacities before the renewal. Accordingly, the air-conditioning unit for vehicle 100b can be configured so as to be capable of fitting in the frame 8.

Further, the sizes of the compressor 11b, the outdoor heat exchanger 14b, and the indoor heat exchanger 12b are set to be substantially equivalent or smaller than the sizes before the renewal. Accordingly, the air-conditioning unit for vehicle 100b can be configured so as to be capable of fitting in the frame 8.

For example, as shown in FIGS. 4 and 5, even if there are restrictions on the sizes of the compressors 11, indoor heat exchangers 12, and the outdoor heat exchangers 14 in order to house them in the frame 8, it is possible to configure the air-conditioning unit for vehicle 100b so that it is capable of fitting in the frame 8.

Further, it is possible to shorten the time required to change the design from the air-conditioning unit for vehicle 100a by making the size of the compressor 11b be substantially equivalent. Further, it is possible to shorten the period of the renewing work.

Furthermore, the control of the control unit 300 is changed such that the operating frequency of the inverter 200 is higher than that before the renewal. Accordingly, due to the settings change of the control unit 300, it will be possible to increase the circulating amount of refrigerant in the refrigerant circuit, and the time required to change the design from the air-conditioning unit for vehicle 100a can be shortened. Further, it is possible to shorten the period of the renewing work.

Additionally, the settings change of the control unit 300 is performed by changing the preset information content. Accordingly, there will be no need to change the hardware of the inverter 200 and the control unit 300, and it will be possible to reduce the time required to change the design from the air-conditioning unit for vehicle 100a. Further, it is possible to shorten the period of the renewing work.

Furthermore, the pressure on the high-pressure side of the air-conditioning unit for vehicle 100b using the alternative refrigerant becomes higher than that before the renewal. Compared with the refrigerant pipes before the renewal, the refrigerant pipes included in the refrigerant circuit of the air-conditioning unit for vehicle 100b are configured to be applicable to increase in the operating pressure of the refrigerant. For example, the thickness of the refrigerant pipes is increased. Accordingly, the weight of the refrigerant pipes after the renewal is larger than that before the renewal.

Therefore, it is desirable that the weight of the air-conditioning unit for vehicle 100b (the total weight of each components) is the same or smaller than that before the renewal by downsizing at least one of the compressor 11, the outdoor heat exchanger 14b, and the indoor heat exchanger 12b.

As such, even when the alternative refrigerant, in which the pressure on the high-pressure side during operation becomes higher compared to that of the former refrigerant, is used, the refrigerant circuit can be made to adapt to the pressure rise without the increase in the weight of the air-conditioning unit for vehicle 100b.

Further, the refrigerant recovery port 50b and the refrigerant filling port 51b that have different bores to that of the refrigerant recovery port 50a and the refrigerant filling port 51a, which are provided in the air-conditioning unit for vehicle 100a, are used. Accordingly, the worker will not make a mistake on the type of refrigerant to be filled during the filling step.

Thus, prevention of operational error during renewal work and improvement of workability can be achieved.

In particular, this advantageous effect is notable in a vehicle disposed with a plurality of air-conditioning units for vehicle 100 where one or more air-conditioning unit for vehicle 100b using the alternative refrigerant and one or more air-conditioning unit for vehicle 100a that uses the former refrigerant co-exists.

Embodiment 2

Figure 10:
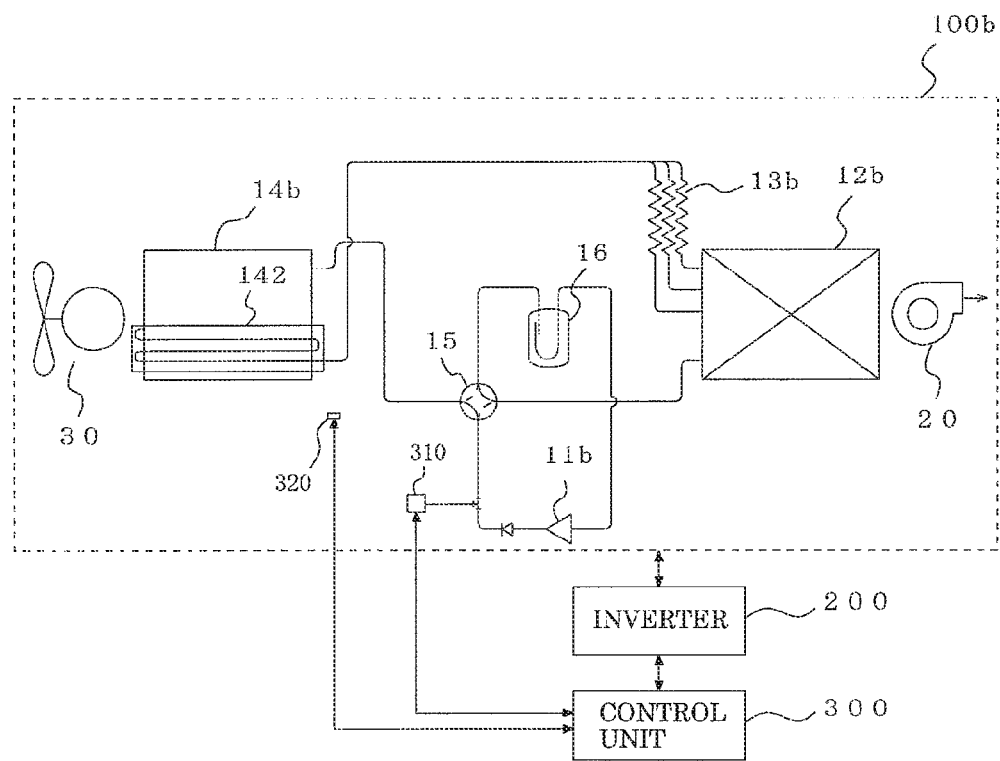
FIG. 10 is a refrigerant circuit diagram of an air-conditioning unit for vehicle 100b after the renewal according to Embodiment 2.

FIG. 10 is a refrigerant circuit diagram of the air-conditioning unit for vehicle 100b after the renewal according to Embodiment 2.

Figure 11:
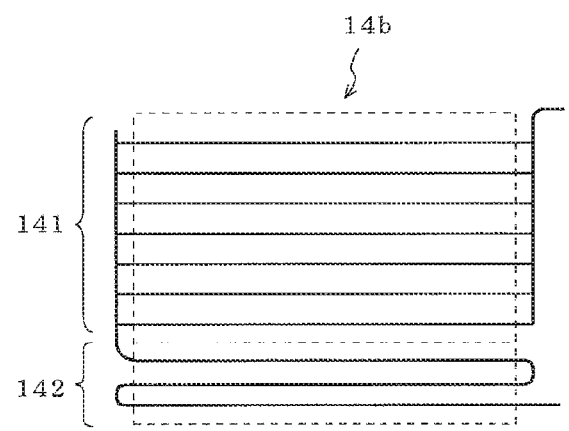
FIG. 11 is a diagram schematically illustrating an outdoor heat exchanger 14b according to Embodiment 2.

FIG. 11 is a diagram schematically illustrating an outdoor heat exchanger 14b according to Embodiment 2.

As shown in FIGS. 10 and 11, the outdoor heat exchanger 14b according to Embodiment 2 includes a main heat exchange circuit 141 and a sub heat exchange circuit 142.

Note that other configurations are the same as that of Embodiment 1 and same portions will be referred to with the same reference numerals.

The main heat exchange circuit 141 includes a plurality of heat transfer pipes. The main heat exchange circuit 141 is configured such that the refrigerant is branched at the inlet pipe on the compressor 11b side into a plurality of heat transfer pipes and, after exchanging heat, is merged on the outlet side of the heat transfer pipes.

After the outlets of the heat transfer pipes of the main heat exchange circuit 141 are merged, the sub heat exchange circuit 142 extends into a single heat transfer pipe or branches into a plurality of heat transfer pipes. The sub heat exchange circuit 142 is configured to merge the refrigerant that has passed through the main heat exchange circuit 141 and to make the refrigerant exchange heat once again.

In the (2) assembly step according to Embodiment 2, the outdoor heat exchanger 14b configured as above is disposed in the frame 8 to form the refrigerant circuit.

Other steps are the same as that of Embodiment 1 described above.

Note that in Embodiment 2, although a description is given of a case in which the outdoor heat exchanger 14b includes the main heat exchange circuit 141 and the sub heat exchange circuit 142, the invention is not limited to this. The indoor heat exchanger 12b may have the same configuration.

As above, in Embodiment 2, at least either of the outdoor heat exchanger 14b and the indoor heat exchanger 12b includes a main heat exchange circuit 141 and a sub heat exchange circuit 142. Accordingly, in addition to the advantageous effects of Embodiment 1 described above, the heat exchange capacity can be increased further.

Furthermore, as described above in Embodiment 1, compared with before the renewal, the indoor heat exchanger 12b and the outdoor heat exchanger 14b can reduce the pipe diameter of the heat transfer pipes and achieve size reduction. Thus, it is possible to provide the sub heat exchange circuit 142 of Embodiment 2 to the extra space created by the size reduction. Therefore, the heat exchange capacity can be further increased without increasing the sizes of the indoor heat exchanger 12b and the outdoor heat exchanger 14b.

Furthermore, by increasing the heat exchange capacity, increase in the pressure on the high-pressure side of the refrigerant circuit can be suppressed.

Embodiment 3

Figure 12:
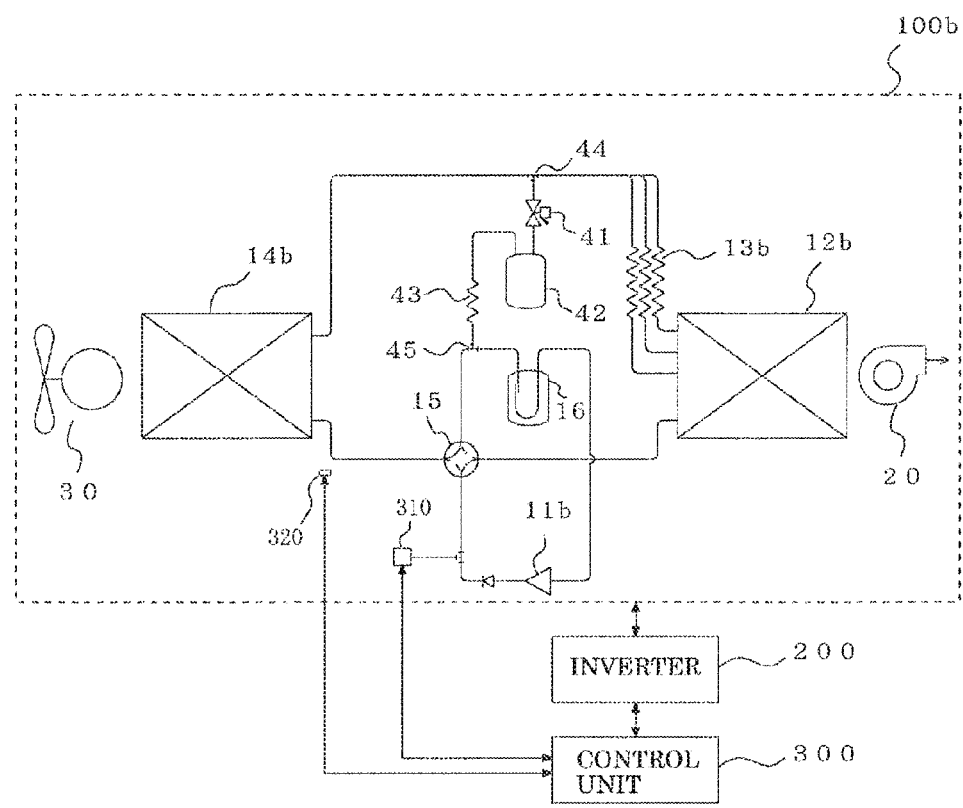
FIG. 12 is a refrigerant circuit diagram of an air-conditioning unit for vehicle 100b after the renewal according to Embodiment 3.

FIG. 12 is a refrigerant circuit diagram of an air-conditioning unit for vehicle 100b after the renewal according to Embodiment 3.

The differences between Embodiment 1 regarding the (2) assembly step of Embodiment 3 will be mainly described. Other steps are the same as that of Embodiment 1 or 2 described above.

Note that components that are the same as Embodiment 1 describe above will be denoted with the same reference numerals.

In addition to the (2) assembly step of Embodiment 1 described above, the below is performed in Embodiment 3.

Note that in Embodiment 3, the refrigerant circuit that sequentially connects the compressor 11b, the four-way valve 15, the outdoor heat exchanger 14b, the pressure reducing means 13b, the indoor heat exchanger 12b, and the accumulator 16 is referred to as a "main circuit".

The pressure sensor 310 that measures the pressure of the alternative refrigerant discharged from the compressor 11b is disposed.

The temperature sensor 320 that measures the temperature of the outside air that is to exchange heat with the outdoor heat exchanger 14b is disposed. Further, the pressure sensor 310 and the temperature sensor 320 are connected to the control unit 300.

The pressure sensor 310 and the temperature sensor 320 may be the ones used in the air-conditioning unit for vehicle 100a before the renewal or may be new ones.

Further, only either one of the pressure sensor 310 and the temperature sensor 320 may be disposed. Furthermore, the pressure sensor 310 may include a pressure switch.

Note that the "pressure sensor 310" and the "temperature sensor 320" of Embodiment 3 correspond to a "sensor" of the invention.

A branch point 44 is provided between the outdoor heat exchanger 14b and the pressure reducing means 13b.

A junction point 45 is provided between the indoor heat exchanger 12b and the compressor.

A bypass circuit is formed by connecting, from the branch point 44 towards the junction point 45, a solenoid valve 41 that opens/closes the refrigerant passage, a bypass receiver 42 that retains the refrigerant, and bypass pressure reducing means 43 that decompresses the refrigerant in this order.

Note that the installation of the bypass receiver 42 may be omitted.

The connecting wire of the solenoid valve 41 is connected to the control unit 300. With this, the opening/closing of the solenoid valve 41 is controlled by the control unit 300.

The "control unit 300" of Embodiment 3 corresponds to "inverter control means" and "on-off valve control means" of the invention.

The "solenoid valve 41" of Embodiment 3 corresponds to an "on-off valve" of the invention.

Note that in Embodiment 3, although a description is given of a case in which the control unit 300 controls the solenoid valve 41, the invention is not limited to this. It may be configured such that other than the control unit 300, on-off valve control means may be disposed in the air-conditioning unit for vehicle 100b to control the solenoid valve 41.

Note that in Embodiment 3, although a description is given of a case in which switching between passage and shutting off of the refrigerant is performed by the opening and closing of the solenoid valve 41, the invention is not limited to this. It may be performed with a flow control valve that controls the flow rate of the refrigerant (including zero flow rates).

The control of the control unit 300 is changed so that the opening/closing of the solenoid valve 41 is controlled on the basis of at least either of the pressure value measured by the pressure sensor 310 and the temperature value measured by the temperature sensor 320. The content of the control will be described below.

The (2) assembly step of Embodiment 3 has been described above.

Next, an operation of the air-conditioning unit for vehicle 100b after the renewal will be described.
[Flow of Refrigerant during Normal Operation]

A refrigerant flow of the air-conditioning unit for vehicle 100b during normal operation will be described.

During normal operation refers to a typical environmental condition in which, for example, cooling operation is performed while the outside air temperature is 33° C., the dry bulb temperature inside the vehicle 1 is 28° C., and the wet bulb temperature inside the vehicle 1 is 23° C.

During normal operation, the control unit 300 shuts off the solenoid valve 41 and forbids the refrigerant to pass through the bypass circuit.

A high-temperature high-pressure gas refrigerant discharged from the compressor 11b is condensed and liquefied in the outdoor heat exchanger 14b. The refrigerant is then distributed into the pressure reducing means 13b and, further, is decompressed into a two-phase refrigerant.

Then, after being evaporated and gasified in the indoor heat exchanger 12b, the refrigerant passes through the accumulator 16 and is suctioned into the compressor 11b.

At this point, inside of the bypass circuit is maintained at a low pressure since it is connected to the main circuit at the junction point 45.
[Flow of Refrigerant during Overload Operation]

Next, a refrigerant flow of the air-conditioning unit for vehicle 100 during an overload operation will be described.

During the overload operation refers to an environmental condition in which the outside air temperature is high and the high pressure side is likely to increase, such as, for example, a cooling operation performed while the outside air temperature is 45° C., the dry bulb temperature inside the vehicle 1 is 35° C., and the wet bulb temperature inside the vehicle 1 is 28° C.

During the overload operation, the control unit 300 opens the solenoid valve 41 and allows the refrigerant to pass through the bypass circuit.

A high-temperature high-pressure gas refrigerant discharged from the compressor 11b is condensed and liquefied in the outdoor heat exchanger 14b. The refrigerant is then branched at the branch point 44 into a refrigerant flowing into the bypass circuit and a refrigerant flowing into the pressure reducing means 13b.

Similar to the normal operation, the refrigerant flowing into the pressure reducing means 13b is distributed into the pressure reducing means 13b, further, is decompressed into a two-phase refrigerant, and is evaporated and gasified in the indoor heat exchanger 12b.

Meanwhile, since the bypass circuit is maintained at a low pressure, it is possible to promptly perform bypassing of the refrigerant at the branch point 44. Since the flow rate of the refrigerant that has flowed into the bypass circuit is restricted by the bypass pressure reducing means 43, it is possible to retain the refrigerant in the bypass circuit (mainly in the bypass receiver 42).

When the refrigerant is retained in the bypass circuit, the amount of refrigerant in the circuit on the high-pressure side is reduced and the pressure therein is reduced.

With this effect, it is possible to avert excessive increase on the high pressure side during the overload operation; hence, it is possible to obtain reliability.

Further, when the refrigerant is retained in the bypass circuit, the amount of refrigerant in the circuit on the low-pressure side is also reduced and the pressure therein is also reduced.

When the amount of refrigerant on the low-pressure side is reduced, a great majority of the heat exchange in the indoor heat exchanger 12b will be performed with a refrigerant in a gaseous state, and accordingly, the suction superheat degree of the compressor 11b is increased and the discharge temperature of the compressor 11b is increased; however, in Embodiment 3, the excessive increase in the discharge temperature can be prevented.

That is, the refrigerant that has been bypassed from the main circuit into the bypass circuit and that has passed through the bypass pressure reducing means 43 is merged with the refrigerant that has been evaporated and gasified in the indoor heat exchanger 12b. The refrigerant that has passed through the bypass pressure reducing means 43 is a two-phase refrigerant with low quality. As such, when the two-phase refrigerant with low quality and the refrigerant that has been evaporated and gasified in the indoor heat exchanger 12b merge, the suction superheat degree of the compressor 11b is reduced; hence, it is possible to prevent excessive rise in the discharge temperature.

Further, when refrigerant is retained in the bypass circuit to suppress the high pressure during the overload operation, the bypass pressure reducing means 43 acts to control the flow rate of the refrigerant flowing into the suction portion of the compressor 11b.

When refrigerant is retained in the bypass circuit to suppress the high pressure during the overload operation, the passage resistance of the bypass pressure reducing means 43 is set so as to enable the suction refrigerant of the compressor 11b to be controlled and maintained to a gaseous state. For example, the passage resistance is set so as to enable the flow rate of the refrigerant to be controlled such that the suction superheat degree of the compressor 11b becomes 5° C. or higher or the discharge superheat degree thereof becomes 20° C. or higher.

As above, the air-conditioning unit for vehicle 100b is disposed with a bypass circuit that prevents excessive increase on the high pressure side during the overload operation even when the alternative refrigerant in which the pressure on the high-pressure side becomes higher compared to that of the former refrigerant is used; hence, it is possible to perform a highly efficient operation while obtaining reliability.

[Control of Solenoid Valve]

In the air-conditioning unit for vehicle 100b, the control unit 300 controls the opening/closing of the solenoid valve 41 on the basis of at least either of the pressure value measured by the pressure sensor 310 and the temperature value measured by the temperature sensor 320.

Control performed on the basis of the pressure value of the pressure sensor 310 will now be described.

Figure 13:
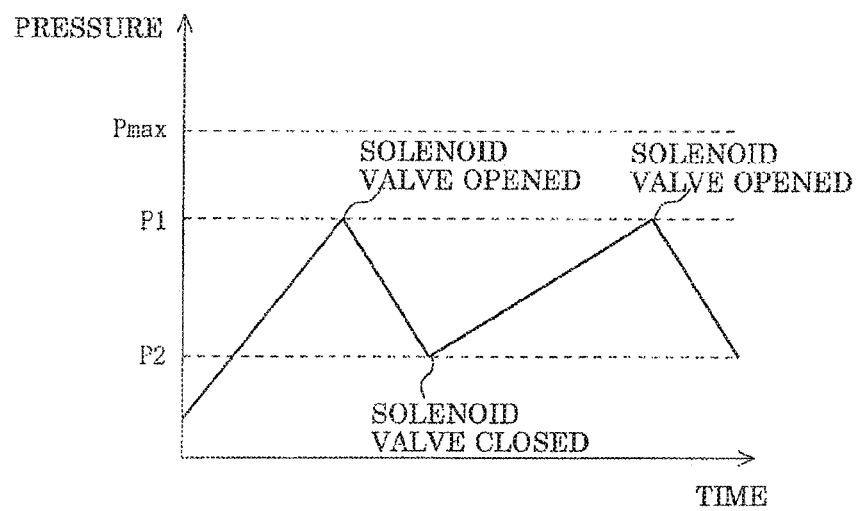
FIG. 13 is a diagram illustrating an operation of the control unit 300 according to Embodiment 3.

FIG. 13 is a diagram illustrating an operation of the control unit 300 according to Embodiment 3.

Referring to FIG. 13, the vertical axis is pressure and the horizontal axis is time.

As shown in FIG. 13, the control unit 300 opens the solenoid valve 41 when the pressure measured by the pressure sensor 310 reaches a predetermined upper pressure limit P1 that is lower than a high pressure upper limit value Pmax. Accordingly, the refrigerant is made to flow into the bypass circuit and the pressure on the high-pressure side is reduced.

While the solenoid valve 41 is in an opened state, the control unit 300 closes the solenoid valve 41 when the pressure measured by the pressure sensor 310 reaches a predetermined lower pressure limit P2 that is lower than the predetermined upper pressure limit P1. Accordingly, the flow of the refrigerant into the bypass circuit is stopped.

As above, by measuring the pressure on the high-pressure side with the pressure sensor 310 and by controlling the opening/closing of the solenoid valve 41 on the basis of this pressure, it is possible to reliably avert excessive increase on the high pressure side during the overload operation.

Further, since the solenoid valve 41 is not overly opened, it is possible to lengthy maintain the appropriate amount of filled refrigerant and to perform a highly efficient operation for a long period of time.

Note that when control is performed in accordance with the temperature value of the temperature sensor 320, for example, the solenoid valve 41 is opened when the outside air temperature reaches a predetermined temperature and the solenoid valve 41 is closed when the outside air temperature drops to a predetermined value.

Figure 14:
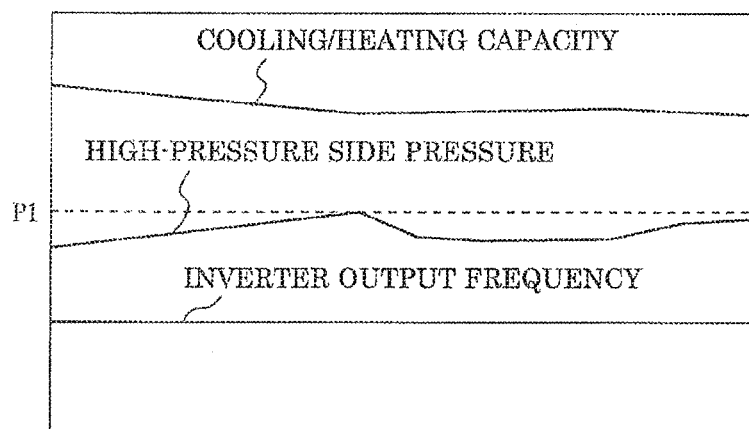
FIG. 14 is a diagram illustrating an operation state of the air-conditioning unit for vehicle 100b after the renewal according to Embodiment 3.

FIG. 14 is a diagram illustrating an operation state of the air-conditioning unit for vehicle 100b after the renewal according to Embodiment 3.

As shown in FIG. 14, it is possible to suppress increase in pressure on the high-pressure side during the overload operation by the above-mentioned control of the control unit 300.

Further, since it is possible to suppress increase in pressure on the high-pressure side while maintaining the output frequency of the inverter 200, it is possible to suppress drop of cooling/heating capacity even during the overload operation.

Accordingly, drop in cooling/heating capacity can be suppressed in the air-conditioning unit for vehicle 100b using the alternative refrigerant.

Further, the maximum value of the outside air temperature allowing operation does not drop when compared with before the renewal.

[Bypass Receiver]

The air-conditioning unit for vehicle 100b of Embodiment 3 is disposed with the bypass receiver 42 that retains the refrigerant that has been branched from the branch point 44 into the bypass circuit. Accordingly, it is possible to retain a large amount of refrigerant; hence, it is possible to further increase the high-pressure suppression effect and to avert excessive increase on the high pressure side more reliably.

Note that in Embodiment 3, although a description is given of a case in which the bypass receiver 42 is provided in the bypass circuit, the invention is not limited to this and the bypass receiver 42 may be removed. This is because the refrigerant is retained in the pipes in the bypass circuit.

Note that in Embodiment 3, although a description is given of an operation in which the solenoid valve 41 is controlled in accordance with the pressure value measured by the pressure sensor 310, the invention is not limited to this.

Figure 15:
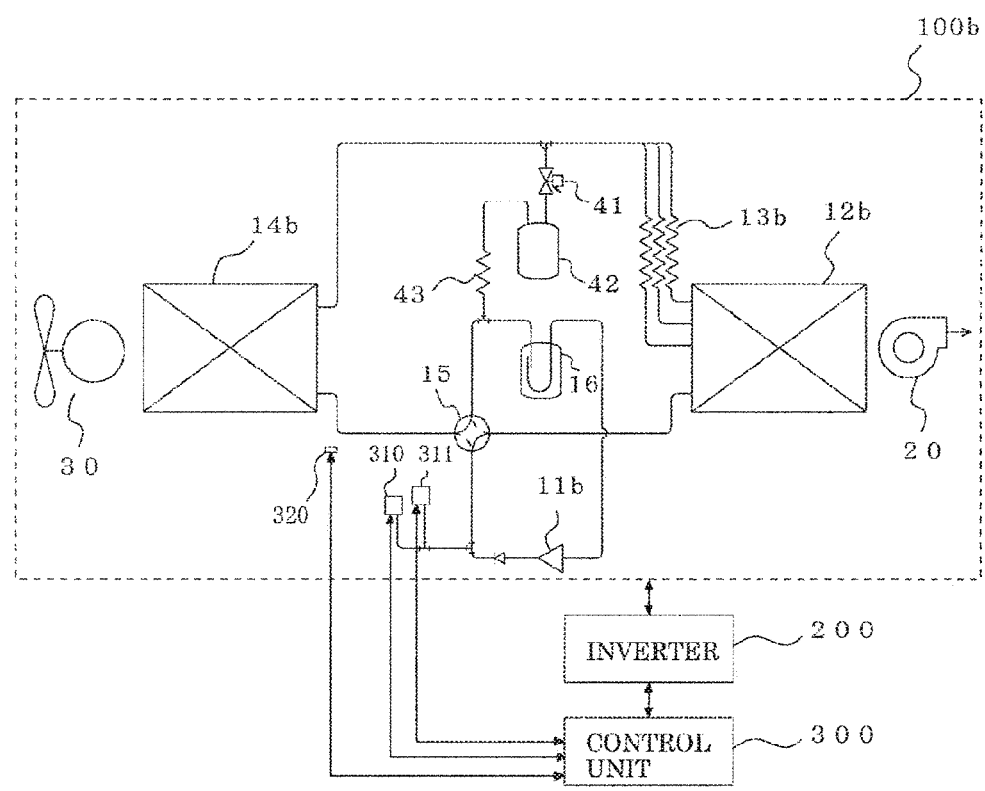
FIG. 15 is a refrigerant circuit diagram of another air-conditioning unit for vehicle 100b after the renewal according to Embodiment 3.

For example, as shown in FIG. 15, a pressure switch 311 that outputs an ON/OFF signal in accordance with the discharge pressure of the compressor 11b may be provided. For example, the pressure switch 311 outputs an ON signal to the control unit 300 when the upper pressure limit P1 is reached and outputs an OFF signal to the control unit 300 when below the lower pressure limit P2. The control unit 300 controls the solenoid valve 41 in accordance with the ON/OFF signal. The same operation can also be performed with the above configuration.

Embodiment 4

Figure 16:
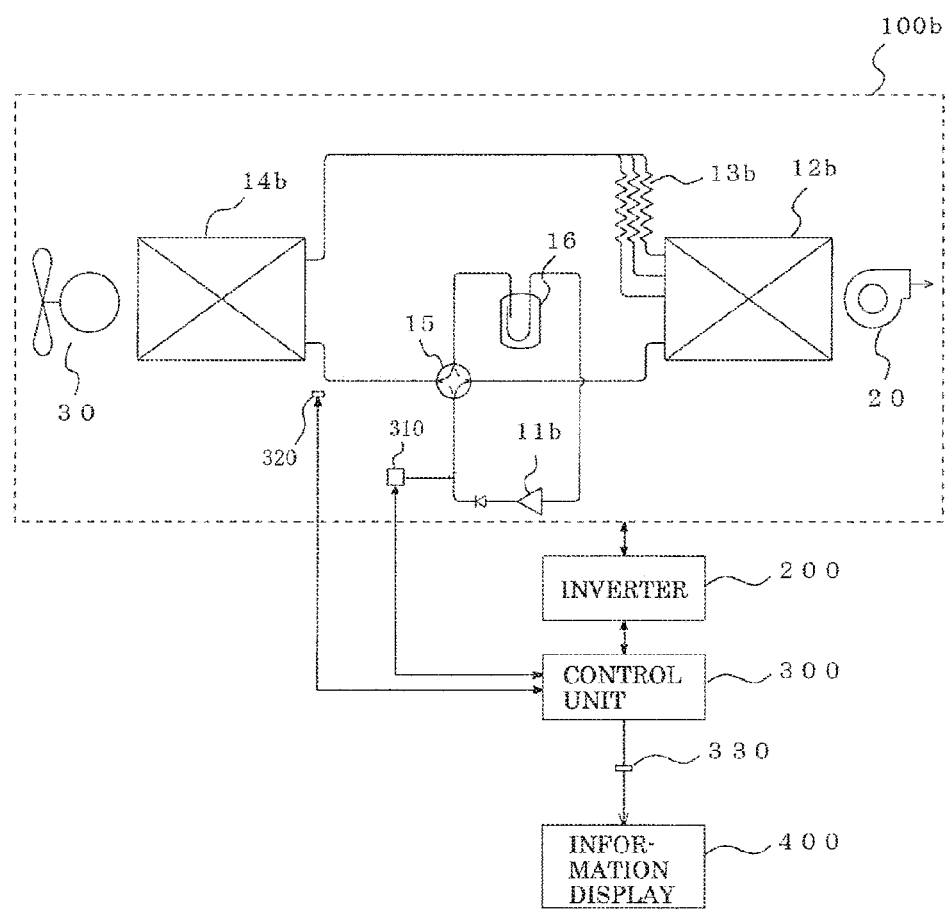
FIG. 16 is a refrigerant circuit diagram of an air-conditioning unit for vehicle 100b after the renewal according to Embodiment 4.

FIG. 16 is a refrigerant circuit diagram of the air-conditioning unit for vehicle 100b after the renewal according to Embodiment 4.

As shown in FIG. 16, the control unit 300 of Embodiment 4 is provided with an output terminal 330 that outputs information set in the control unit 300.

Note that other configurations are the same as that of Embodiments 1 to 3 and same portions will be referred to with the same reference numerals.

In the (2) assembly step of Embodiment 4, the control unit 300 that is configured as above is disposed in the vehicle 1.

The control unit 300 may be the one used in the air-conditioning unit for vehicle 100a before the renewal or may be a new one.

When the control unit 300 that is the one used in the air-conditioning unit for vehicle 100a before the renewal is used, information indicating that the alternative refrigerant is employed is added to the information set in the control unit 300.

Further, when a new control unit 300 is disposed, information indicating that the alternative refrigerant is employed is preset.

Other steps are the same as that of Embodiment 1 described above.

The "control unit 300" of Embodiment 3 corresponds to "inverter control means" and "information providing means" of the invention.

During renewal work or after the renewal, it is possible to output information indicating that the air-conditioning unit for vehicle 100b employs the alternative refrigerant by connecting the control unit 300 and an external information display device 400 through the output terminal 330.

Accordingly, in a vehicle 1 that is disposed with a plurality of air-conditioning units for vehicle 100, even if one or more air-conditioning unit for vehicle 100a using the former refrigerant and one or more air-conditioning unit for vehicle 100b that uses the alternative refrigerant co-exists, it is possible to prevent operational error during renewal work and to achieve improvement of workability.

REFERENCE SIGNS LIST 1 vehicle; 2 roof; 3 ceiling; 4 inlet port; 5 outlet port; 6 duct; 8 frame; 11 compressor; 12 indoor heat exchanger; 13 pressure reducing means; 14 outdoor heat exchanger; 15 four-way valve; 16 accumulator; 20 indoor fan; 30 outdoor fan; 41 solenoid valve; 42 bypass receiver; 43 bypass pressure reducing means; 44 branch point; 45 junction point; 51 refrigerant filling port; 81 side cover; 82 top cover; 83 partition plate; 84 outdoor unit section; 85 indoor unit section; 100 air-conditioning unit for vehicle; 141 main heat exchange circuit; 142 sub heat exchange circuit; 200 inverter; 300 control unit; 310 pressure sensor; 311 pressure switch; 320 temperature sensor; 330 output terminal; 400 information display device; 500 refrigerant supply device; 501 on-off valve.

The invention claimed is:

1. A renewal method of an air-conditioning unit for a vehicle having an inverter in which a first air-conditioning unit, using a first refrigerant, disposed in a frame mounted on the vehicle is renewed to a second air-conditioning unit using a second refrigerant, the renewal method comprising:
a removal step of removing the first air-conditioning unit from the frame of the vehicle, the first air-conditioning unit including a first compressor, a first heat source side heat exchanger, a first pressure reducing means, and a first use side heat exchanger, and detaching, from the first compressor, a connecting wire of the inverter driving the first compressor;
an assembly step of disposing the second air-condition ng unit in the frame of the vehicle, the second air-conditioning unit including a second compressor, a second heat source side heat exchanger, second pressure reducing means, and a second use side heat exchanger and the second air-conditioning unit configured to fit in the frame of the vehicle, and attaching the connecting wire of the inverter which has been detached from the first compressor in the removal step to the second compressor;
a filling step of filling the second refrigerant into the second air-conditioning unit that has been disposed in the frame; and
a settings changing step of changing settings that change control of the inverter such that a circulating amount of the second refrigerant of the second air-conditioning unit is larger than a circulating amount of the first refrigerant of the first air-conditioning unit.

2. The renewal method of the air-conditioning unit for the vehicle of claim 1, wherein
sizes of the second compressor, the second heat source side heat exchanger, and the second use side heat exchanger are substantially equivalent to or smaller than sizes of the respective first compressor, the first heat source side heat exchanger, and the first use side heat exchanger.

3. The renewal method of the air-conditioning unit for the vehicle of claim 1, wherein
the removal step further includes the step of
removing first pipes that sequentially connect the first compressor, the first heat source side heat exchanger, the first pressure reducing means, and the first use side heat exchanger;

the assembly step further includes the step of
sequentially connecting the second compressor, the second heat source side heat exchanger, the second pressure reducing means, and the second use side heat exchanger with second pipes;
a thickness of the second pipes is greater than a thickness of the first pipes; and
a total weight of the second compressor, the second heat source side heat exchanger, the second use side heat exchanger, and the second pipes is substantially equivalent to or smaller than a total weight of the first compressor, the first heat source side heat exchanger, the first use side heat exchanger, and the first pipes.

4. The renewal method of the air-conditioning unit for the vehicle of claim 1, wherein
control of inverter control means controlling the inverter is changed in the settings changing step by changing an information content that is preset in the inverter control means.

5. The renewal method of the air-conditioning unit for the vehicle of claim 1, wherein
a pipe diameter of a heat transfer pipe included in the second heat source side heat exchanger is smaller than a pipe diameter of a heat transfer pipe included in the first heat source side heat exchanger, and
a pipe diameter of a heat transfer pipe included in the second use side heat exchanger is smaller than a pipe diameter of a heat transfer pipe included in the first use side heat exchanger.

6. The renewal method of the air-conditioning unit for the vehicle of claim 1, wherein at least either of the second heat source side heat exchanger and the second use side heat exchanger includes:
a main heat exchange circuit having a plurality of heat transfer pipes; and
a sub heat exchange circuit that merges an outlet of each heat transfer pipe of the main heat exchange circuit together and that extends into a single heat transfer pipe or branches into a plurality of heat transfer pipes.

7. The renewal method of the air-conditioning unit for the vehicle of claim 1, wherein the assembly step further includes the steps of:
forming a main circuit that circulates the second refrigerant by connecting the second compressor, the second heat source side heat exchanger, the second pressure reducing means, and the second use side heat exchanger;
disposing a sensor that measures at least either of a pressure of the second refrigerant that is discharged from the second compressor and a temperature of outside air that is to exchange heat with the second heat source side heat exchanger;
forming a bypass circuit by providing a branch point between the second heat source side heat exchanger and the second pressure reducing means, by providing a junction point between the second use side heat exchanger and the compressor, and by sequentially connecting, from the branch point to the junction point, an on-off valve and bypass pressure reducing means that decompresses the second refrigerant; and
disposing, in the vehicle, on-off valve control means that controls the opening closing of the on-off valve in accordance with at least either of a pressure value and a temperature value measured by the sensor.

8. The renewal method of the air-conditioning unit for the vehicle of claim 7, wherein the assembly step further includes the step of
disposing, between the on-off valve and the bypass pressure reducing means, a bypass receiver that retains the second refrigerant.

9. The renewal method of the air-conditioning unit for the vehicle of claim 1, wherein the assembly step further includes the step of
disposing, in the vehicle, information providing means that outputs information indicating that the second air-conditioning unit employs the second refrigerant.

10. The renewal method of the air-conditioning unit for the vehicle of claim 1, wherein
the filling step further includes the steps of:
connecting a refrigerant filling port that is provided in the second air-conditioning unit and a refrigerant supply device that supplies the second refrigerant; and
filling the second refrigerant into the second air-conditioning unit from the refrigerant supply device, and
a bore of the refrigerant filling port that is provided in the second air-conditioning unit is different from a bore of the refrigerant filling port that is provided in the first air-conditioning unit.

11. The renewal method of the air-conditioning unit for the vehicle of claim 1, wherein
in the setting changing step, the way of a control for the inverter is changed such that an operating frequency of the inverter for the second compressor is increased by a predetermined rate compared to an operating frequency for the first compressor.

* * * * *